US007337969B2

(12) United States Patent
Critelli et al.

(10) Patent No.: US 7,337,969 B2
(45) **Date of Patent: *Mar. 4, 2008**

(54) METHOD FOR IMPROVING THE READABILITY OF COMPOSITE IMAGES

(75) Inventors: Michael J. Critelli, Darien, CT (US); Judith D. Auslander, Westport, CT (US); Perry A. Pierce, Darien, CT (US); Charles R. Malandra, Jr., Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/235,326

(22) Filed: Sep. 26, 2005

(65) Prior Publication Data

US 2006/0022050 A1 Feb. 2, 2006

Related U.S. Application Data

(63) Continuation of application No. 10/413,877, filed on Apr. 15, 2003, now Pat. No. 6,948,660.

(60) Provisional application No. 60/436,930, filed on Dec. 30, 2002.

(51) Int. Cl.
*G06K 7/10* (2006.01)

(52) U.S. Cl. .................................. 235/462.08; 235/468

(58) Field of Classification Search ........... 235/462.08, 235/462.09, 468, 469, 487, 491; 283/71
See application file for complete search history.

(56) References Cited

U.S. PATENT DOCUMENTS

| | | | | |
|---|---|---|---|---|
| 6,142,380 | A * | 11/2000 | Sansone et al. | 235/487 |
| 6,149,719 | A * | 11/2000 | Houle | 106/31.14 |
| 6,199,765 | B1 | 3/2001 | Uhling | 235/494 |
| 6,234,694 | B1 | 5/2001 | Brookner | 400/76 |
| 6,260,762 | B1 | 7/2001 | Lohmann | 235/462.08 |
| 6,428,219 | B1 * | 8/2002 | Stier et al. | 400/76 |
| 6,948,660 | B2 * | 9/2005 | Critelli et al. | 235/462.08 |

FOREIGN PATENT DOCUMENTS

| | | |
|---|---|---|
| EP | 1035515 A | 9/2000 |

* cited by examiner

*Primary Examiner*—Daniel Hess
*Assistant Examiner*—April A. Taylor
(74) *Attorney, Agent, or Firm*—Charles R. Malandra, Jr.; Angelo N. Chaclas

(57) ABSTRACT

A method for improving the readability of composite images by determining available areas on a document where no text or graphics will be printed in visible ink and printing one or more 2-D bar code with invisible ink at a size pre-determined based on the available areas. The one or more auxiliary 2-D bar codes are printed in luminescent ink, either invisible or lightly colored when viewed under white light.

17 Claims, 2 Drawing Sheets

METHOD FOR IMPROVING THE READABILITY OF COMPOSITE IMAGES

CROSS REFERENCE TO RELATED APPLICATIONS

This application is a continuation of application Ser. No. 10/413,877 filed Apr. 15, 2003 now U.S. Pat. No. 6,948,660.

This application claims priority under 35 U.S.C. section 119(e) from Provisional Patent Application Ser. No. 60/436,930, filed Dec. 30, 2002, entitled METHOD FOR IMPROVING THE READABILITY OF COMPOSITE IMAGES, which is incorporated herein by reference in its entirety.

BACKGROUND OF THE INVENTION

The invention relates to printing composite images that can contain large amounts of information, optionally including redundant information, in an eye-pleasing format. The composite images provide high information density, with redundancy, in a highly reliable and visually pleasing format. The composite images are achieved with a novel arrangement of largely invisible, machine-readable postage evidencing information, e.g., Information Based Indicia (IBI) images containing 2-D bar code information, and dark, visible images containing human-readable postage information, which typically includes address information. The images can be printed using conventional ink jet printers.

Postage evidencing information, including IBI images, is a significant feature of the Information-Based Indicia Program (IBIP) implemented by the United States Postal Service (USPS) as a distributed trusted system. The IBIP includes open IBI postage evidencing systems, which can apply postage in addition to performing other functions not possible with conventional postage machines. The IBIP requires printing high density, two-dimensional (2-D) bar codes, such as PDF417 bar codes, on mailpieces. The requirements for printing a PDF417 2-D bar code are set forth in The Uniform Symbology Specification. The Postal Service expects the IBIP to provide cost-effective assurance of postage payment for each mailpiece processed. IBI images comprise certain human readable information and two-dimensional (2-D) bar code information, which can contain such assurance. However, printed information is often obscured, diminishing its reliability even with error correction technology. There is a need for a high-density image format that includes both human readable and bar code information with high reliability.

The USPS has published specifications for the IBIP such as PERFORMANCE CRITERIA FOR INFORMATION-BASED INDICIA AND SECURITY ARCHITECTURE FOR OPEN IBI POSTAGE EVIDENCING SYSTEMS (PCIBI-O), dated Jan. 12, 1999; PERFORMANCE CRITERIA FOR INFORMATION-BASED INDICIA AND SECURITY ARCHITECTURE FOR CLOSED IBI POSTAGE METERING SYSTEMS (PCIBI-C), dated Feb. 23, 2000; and PERFORMANCE CRITERIA FOR INFORMATION-BASED INDICIA PROGRAM (IBIP) SYSTEMS EMPLOYING CENTRALIZED POSTAL SECURITY DEVICES, dated Aug. 17, 2000; (collectively referred to herein as the "IBIP Specifications"). The IBIP includes interfacing user (customer), postal and vendor infrastructures, which are the system elements of the program. The term "postage evidencing information" is meant to include IBI images meeting the current IBIP Specifications as well as alternative formats. The IBIP Specifications require a minimum bar code read rate of 99.5% and place the responsibility on each IBIP vendor to meet this requirement.

A user infrastructure, which typically resides at the user's site, can comprise a postage security device (PSD) coupled to a host system. The PSD is a secure processor-based accounting device that dispenses and accounts for postal value stored therein. The host system (Host) may be a personal computer (PC) or a meter-based host processor. Alternatively, the PSD can be located on a server remote from the user. Wherever the PSD is located, it would be desirable for IBIP indicium to be printed using an open system comprised of conventional desk-top and other ink jet printers not dedicated to postage, but this capability has not been fully realized without sacrificing readability or the visual appearance of the printed mailpiece.

The IBIP Specifications permit large format IBI images, e.g., 2-D bar codes, but there are several practical limits to the use of images that overlap conventional address information. For example, black and other dark colored inks tend to quench the fluorescence from invisible inks. Thus, if conventional address information overlaps with the IBI image, the IBI image could lose reliability and fall outside of the Specifications. Also, simple smudging of an envelope can have the same effect. The provision of error correction technology can provide a margin of protection but as conventionally employed, due to its mathematical underpinnings, must operate from a limited data set. It would be desirable to provide a technology that supplemented and, preferably, enhanced error correction technology.

The need for high resolution has posed significant technical challenges. Current systems are challenged to provide a suitable combination of convenience, acceptable appearance and high readability at high information densities. In U.S. patent application Ser. No. 10/413,096, filed concurrently herewith, which is incorporated herein by reference in its entirety, there is described a system which enables printing large amounts of information on a mailpiece without causing the mailpiece to become unsightly due to the presence of too much printing in a small space. The system employs luminescent invisible or lightly colored ink for printing at least a portion of the bar code portions of the information. This system has an advantage that attempts to maximize print information in an invisible 2-D bar code will not affect the human readable portion; but, unless provision is made for redundancy for the 2-D bar code information, problems can still occur.

When using invisible, fluorescent ink for printing the 2-D bar code, the bar code will not obscure the human readable printed information, but the human readable printed information can obscure the bar code. Overlap of the 2-D bar code and the printed conventional human readable address information can diminish the readability of the 2-D bar code or other information to the extent that even error correction codes cannot obtain the required read rates. Typically, suitable fluorescent inks irradiate in the red or infrared range when excited by ultraviolet light. But, because black and other dark visible inks tend to quench fluorescence, any overprinting of dark ink on a fluorescent ink can cause obscuration to the point of diminishing or destroying readability.

There remains a need for a method that provides machine-readable IBI images containing both large format 2-D bar code information with high levels of error correction in invisible or light colored luminescent ink, along with conventionally printed address and postage information to provide increased read rates and the provision of high information density without obscuring any one component. It would be desirable in this context to provide especially enhanced readability with a high contrast of the fluorescent image in a format that enabled improved read rates in the presence of obscured information.

SUMMARY OF THE INVENTION

It is an object of the invention to provide a method for printing postal and other information with a high information density in a visually pleasing and highly reliable form.

It is another object of the invention to provide a method for printing composite images that can contain large amounts of information, including redundant information, in an eye-pleasing format.

It is another object of the invention to provide a method for printing on a document composite images containing largely invisible, machine-readable information, such as postage-evidencing symbology, in a format that enables provision of significant redundant information without interference or overlapping with the dark, visible images printed on the document, such as address and postage information printed on an envelope.

It is another object of invention to provide for "redundancy", which goes beyond mere mathematical error correction technology and provides the ability to recover obscured bar code or human readable information.

It is yet another object of the invention to provide a system that can produce machine-readable code, for example, postage-evidencing symbology containing both large format 2-D bar code information and address information with a maximum level of error correction code possible to provide increased read rates and the provision of high information density, permitting the printing of information redundant with that otherwise printed, without obscuring any one component.

These and other objects are accomplished by the invention, which provides improvements for printing machine-readable information, for example, postage-evidencing symbology, and visible address information on a document such as a mailpiece.

The method of the invention comprises: determining document, e.g., envelope, size (input envelope size), determining location and area of text and graphics to be printed with visible ink, determining areas on the document where no text or graphics will be printed in visible ink ("available area"), determining maximum size and, preferably error correction code level of 2-D bar code that will fit in each available area on the document, generating bitmap for at least one 2-D bar code to be printed in at least one of the available areas, printing a 2-D bar code in the largest available area, and printing at least one additional 2-D bar code in a second available area to include information redundant with that printed elsewhere. The second bar code can be sized for maximum size based on the second available area.

The method has a number of preferred aspects, many of which are described below and shown in the accompanying drawings. The present invention is not limited to the preferred embodiment of printing on a mailpiece. The present invention is suitable for printing machine-readable code on any type of document.

BRIEF DESCRIPTION OF THE DRAWING

The invention will be better understood and its advantages will become more apparent from the following description, especially when read in light of the accompanying drawing, wherein.

DETAILED DESCRIPTION OF THE INVENTION

Figure 1:
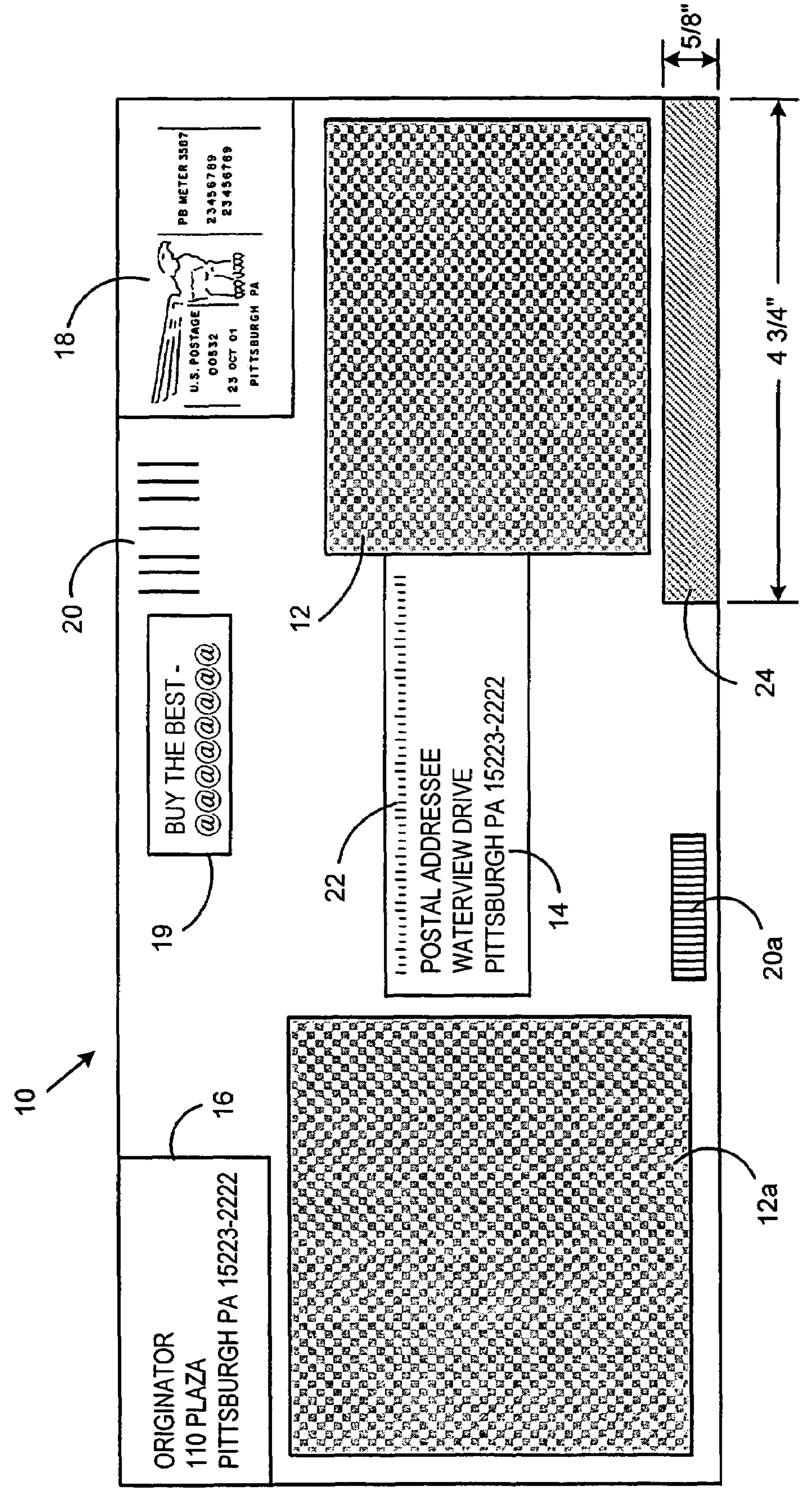
FIG. 1 is a schematic drawing illustrating a layout of a mailpiece including a plurality of 2-D bar codes, which can be printed in invisible or light colored luminescent ink (but illustrated as gray), along with conventionally printed address and postage information, typically printed in black ink, in accord with the invention.

The invention relates to printing composite images that can contain large amounts of information on mailpieces, such as mailpiece 10 illustrated in FIG. 1, which employs exemplary IBI images comprising human readable information and two-dimensional (2-D) bar code information. The composite images, as will be explained in detail below, preferably include redundant information.

Referring to FIG. 1, there is shown a schematic drawing illustrating a layout of a mailpiece 10 including a 2-D bar codes 12 and 12*a*, which can be printed in invisible or light colored luminescent ink, along with conventionally printed addresses 14, 16 and postage information 18 and optional advertising information 19 and a Facing Identification Mark (FIM) 20, which are typically printed in black ink. The preferred embodiment of the present invention is described herein for use in printing authentication bar codes on mailpieces. It will be understood that the invention can also be used to print information, such as authentication information, or bar codes, on other documents, including but not limited to legal or financial documents and on labels that may be affixed to such documents.

The presence of an FIM 20 adds another level of complexity and is currently required by United States Postal Service IBI Specifications to be part of the IBI image so that the USPS Advanced Facer Canceller may detect the presence of an IBI mailpiece so as to sort the mailpiece properly. In the United States, the required FIM is a pattern of vertical bars printed in the upper right portion of the mailpiece, to the left of the indicia. As currently specified, the United States Postal Service FIM is large, taking up approximately 20% of the proposed IBI image. A FIM uses a large amount of envelope space, which restricts the amount of information that can conveniently and neatly be presented in the IBI image. Accordingly, the space remaining for other 2-D bar code information is at a premium. Optional FIM's are permitted, but can yet further diminish the space available for a 2-D bar code.

The address block 14 of a mailpiece is the primary source of address information and contains a human-readable address and preferably includes a Delivery Point Bar Code (DPBC), shown schematically as 22. It is typically printed in black or other dark-colored ink. A DPBC is formed by adding 10 bars (representing two additional digits) to a standard ZIP+4 code. The ZIP+4 code is a single field of 52 bars consisting of a frame bar, a series of 25 bars that represent the correction digit, and a final frame bar. The DPBC or other POSTNET (POSTal Numeric Encoding Technique) bar code can be printed just about anywhere on the address side of the mailpiece that is at least ⅛th inch from any edge. Typically, it is printed in the upper portion of the address above the recipients name as shown in FIG. 1. Each letter-size piece in an automation rate mailing and each piece of upgradeable Presorted First-Class Mail or upgradeable Standard Mail, must have a barcode clear zone unless the piece bears a DPBC in the address block. Such a zone is thus required in the preferred embodiments herein and is illustrated as 24 in FIG. 1.

The 2-D bar codes, schematically illustrated as 12 and 12*a*, are codes capable of being read in the horizontal and vertical directions. To achieve this objective, they are comprised of arranged geometric modules, such as squares, capable of encoding digital information. Typically, the modules forming a 2-D bar code image block are square and solidly imprinted, but can be of other effective configurations. As needed, 2-D bar codes can optionally be provided with information to provide a variety of needs, including for redundancy of postage or address information as well as security and validation codes.

Figure 2:
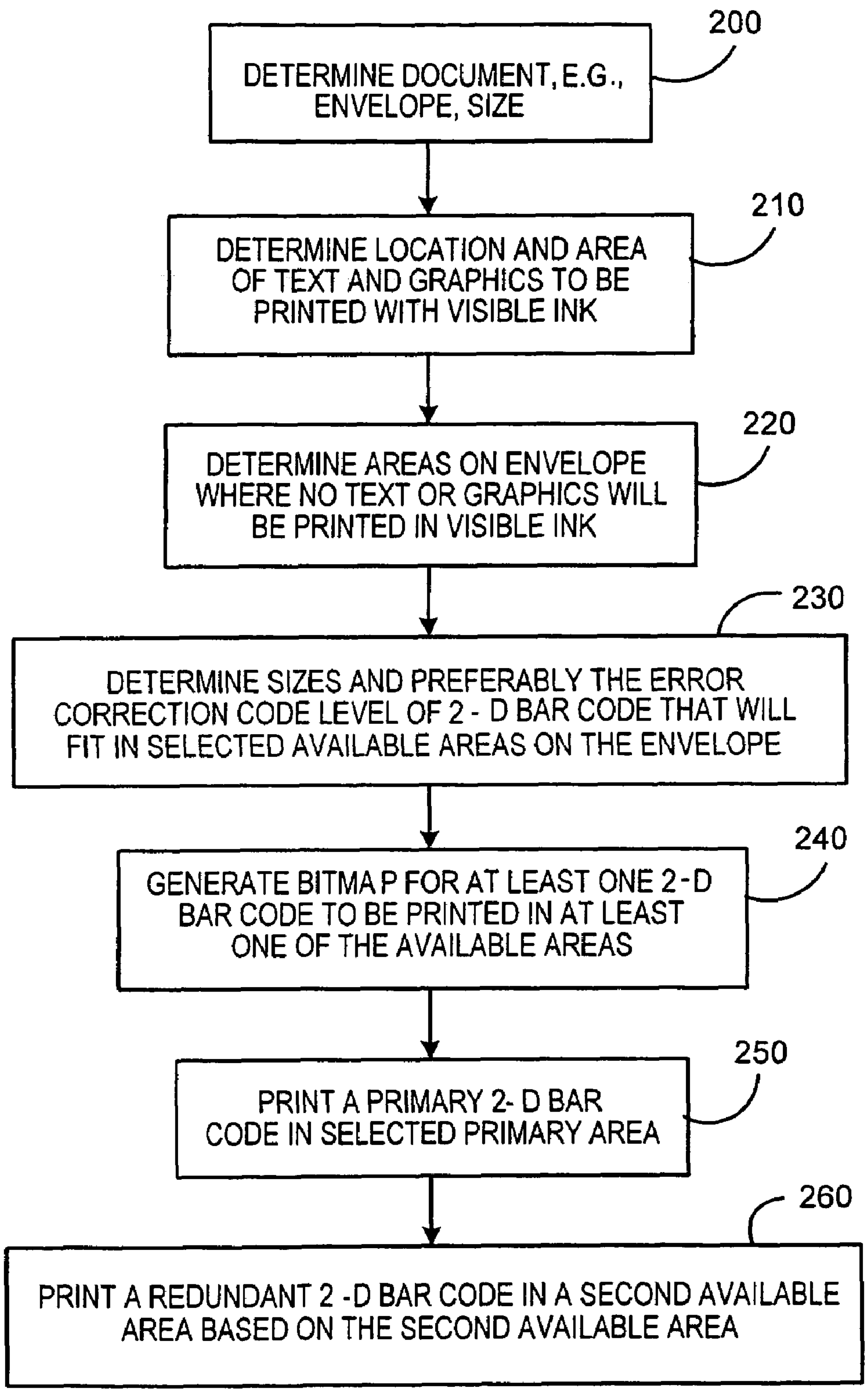
FIG. 2 is a process flow diagram for a preferred process arrangement of the invention.

Referring now to FIG. 2, as an initial step 200 in the process, the envelope size may be determined automatically, for example, by using optical equipment. However, the more likely determination of envelope size will be accomplished by a user inputting an envelope size or dimensions into a computer or postage printing machine on which the postage printing software is operating. Then, at step 210, the location and area of text and graphics to be printed with visible ink are determined. This will enable the determination, at step 220, of areas on an envelope where no text or graphics will be printed in visible ink. The resulting determination of "available area", also referred to herein as "available real estate", will be used to determine, at step 230, the overall size, error correction level, location and/or content of one or more 2-D bar codes that will be printed on the envelope. The method then calls for determining the maximum size of a 2-D bar code that will fit in each available area on the envelope and generating bitmap for at least one 2-D bar code to be printed in at least one of the available areas. This will be, for example, a primary 2-D bar code 12 as shown in FIG. 1. The method calls for selecting, at step 240, areas for printing bitmaps generated, and this can be done by automatically or with operator intervention. A primary generated bit map is then utilized, at step 250, to print a 2-D bar code in one selected area, preferably the largest available area. A determination is also made as to available area for printing an auxiliary 2-D bar code 12*a*, including redundant information, in at least a second available area. The second bar code (and, if desired, others) is sized, preferably for maximum size, based on a second available area. Again, a bit map is generated and the image is printed, at step 260. The net effect is the capability of providing large amounts of useful, required and optional information in a visually attractive format on a mailpiece. FIG. 1 shows areas 12 and 12*a* on opposite sides of address information 14. An optional FIM 20*a* can be printed with an ink that has the correct wavelength to be read by mail processing equipment, such as a facer-canceller, and that is associated with bar code(s) 12*a* to identify the type and number of bar codes and create a signal to provide instructions for reading each bar code, or for some other purpose.

The exemplary 2-D bar codes 12 and 12*a* arrangement printed on a mailpiece 10 in FIG. 1, each comprise an arrangement of printed modules that are oriented and arranged to be readable as including required, optional and redundant 2-D bar code information. The IBI images according to the invention are preferably printed in invisible ink, but can be in light colored ink if desired. The 2-D bar codes are shown schematically as gray, checked areas, for illustration only. By the term "redundant 2-D bar code" is meant a bar code containing information that is at least redundant with information available within the primary bar code.

The invention has particular applicability to open IBI postage evidencing systems; i.e., those using personal computers, which have the ability to print postage but are not dedicated to that purpose, and using conventional ink jet printers. In an open IBI postage evidencing system, the size of the envelope and the footprint of the images to be printed on the envelope (typically return address, recipient address, add slogan and postage) are known. The 2-D bar code images as illustrated as 12 and 12*a*, are preferably printed with luminescent ink of the type described in the previously noted U.S. patent application Ser. No. 10/413,096, in U.S. Pat. No. 5,837,042, to Lent, et al. or other patents such as U.S. Pat. No. 6,402,986 to Jones II, et al., and are conveniently printed by ink jet print means. The system is designed to the greatest possible use of available real estate on an envelope by permitting a 2-D bar code printed with invisible ink to overlap human readable information. The invention provides for the use of a higher level of error correction in the 2-D bar code that will result in a higher read rate of the bar code.

To maintain readability of all elements, it is preferred that the postage-evidencing information 18 not overlap with information in the address block 14 and/or a barcode clear zone 24 when the piece bears a DPBC 22 in the address block 14. As noted above, an optional FIM 20*a* can be printed with an ink having the correct wavelength to be read by mail processing equipment, such as a facer-canceller.

The invention provides an envelope that can be visually acceptable with high information density, and the invention enables adding complexity without sacrificing readability or reliability. It is a distinct advantage of the invention that the composite images can optionally include redundant information to provide more "resiliency" to image or envelope damage. The invention can print a plurality of redundant 2-D bar codes to better enable maintenance of high read rates.

The method of the invention is designed to determine available real estate on the envelope and print at least primary and a first auxiliary 2-D bar code with invisible ink at a size pre-determined based on the available real estate. Computations, selections and comparisons are facilitated by a digital computer having suitable reference values stored, but can be assisted as need be or as is convenient by a skilled technician with knowledge of the necessary available information and result criteria. Thus, where the process calls for determining the size of an envelope or other mailpiece, this can be accomplished by a technician noting that all mailings in a particular group are number 10 envelopes, or the like, without the need to actually measure each envelope.

It is a distinct advantage of the invention that the composite images utilize a plurality of large-format 2-D bar codes with the maximum amount of error correction available for the intended area. This enables the inclusion of redundant information to provide more "resiliency" in the event of envelope damage. It can, additionally, by providing error correction coding, permit maintenance of high read rates despite damage to otherwise critical information. Thus, if a portion of the information in the machine-readable postage-evidencing symbology block becomes obscured due to poor printing or handling, the primary image 12 or auxiliary image 12*a* can have redundant information available.

The primary bar code 12 contains the usual postal and address information normally associated with an IBI image. The auxiliary bar code 12*a* can contain a variety of useful, but optional, information as well as simply repeating the IBI data in the primary bar code 12. FIG. 1 shows address information 14 printed in dark ink on the mailpiece, with a primary 2-D bar code 12 printed in the primary available area is on one side of the address 14 and the auxiliary 2-D bar code 12*a* containing redundant information is printed in a second available area on the other side of the address 14. The invention, then, permits a higher reliability than currently available by providing redundancy of critical address and/or postage information that can be read and utilized in the event that the principal source of the information is obscured. It can also provide an additional security check by providing means to compare the information to that present elsewhere on the mailpiece, in either human-readable or machine readable format.

The method of the invention can utilize any practical number of auxiliary 2-D bar codes. The number and location of the auxiliary bar codes will depend on the amount of available space on the envelope or other mailpiece as well as the need or desire to provide additional information. The individual bar codes can be printed to contain information for a specific purpose solely served by an individual bar code. In addition, one or more of the bar codes can be provided with information that is intended to be read and utilized in concert. The bar codes of the invention can be printed with an auxiliary FIM, e.g., 20*a* in FIG. 1, if desired, for utilization by automated machine readers to indicate the presence and/or location of a bar code(s) with particular information.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention, which is seen in the above description and otherwise defined by the following claims. The claims are meant to cover the indicated elements and steps in any arrangement or sequence, which is effective to meet the objectives, intended for the invention, unless the context specifically indicates the contrary.

What is claimed is:

1. A method for printing a composite image on a mailpiece, comprising the steps of:

a) determining locations and area of text and graphics to be printed on a mailpiece with visible ink, b) determining available areas on the mailpiece where no text or graphics will be printed in visible ink, c) determining a maximum size of a 2-D bar code that will fit in at least one of the available areas on the mailpiece, d) generating a bitmap a primary 2-D bar code to be printed in a primary one of the available areas, and e) printing the primary 2-D bar code from the bitmap with a luminescent ink in the primary available area.

2. The method according to claim 1 which further includes the step of printing an optional FIM associated with an auxiliary bar code to identify the type of bar code and create a signal to provide instructions for reading the auxiliary bar code.

3. A method according to claim 1 wherein the method comprises the further steps of:

f) determining additional available areas on the mailpiece where no text or graphics will be printed, g) determining the maximum size of a 2-D bar code that will fit in each of the additional available areas on the mailpiece, h) generating a bitmap for at least one redundant 2-D bar code to be printed in the additional available area i) printing with a luminescent ink in one of the additional available areas at least one redundant 2-D bar code from the at least one redundant 2-D bar code bitmap.

4. A method according to claim 1 wherein the primary 2-D bar code is printed in the largest available area.

5. A method according to claim 1 wherein the primary 2-D bar code is printed in the maximum size permitted for printing without overlap with other printed areas.

6. A method according to claim 1 wherein the luminescent ink is invisible luminescent ink.

7. A method for printing on a document a composite image, comprising the steps of:

a) determining locations and areas of text and graphics to be printed on a document with visible ink, b) determining at least one available area on the document where no text or graphics will be printed in visible ink, c) determining a maximum size of a machine-readable code that will fit in the available area on the document, d) generating a bitmap for machine-readable code to be printed in the available area, and e) printing a primary machine-readable code from said bitmap with a luminescent ink in the available area.

8. A method according to claim 7 wherein the method comprises the further steps of f) determining additional available areas on the document where no text or graphics will be printed, g) determining a second maximum size of at least one redundant machine-readable code that will fit in the additional available areas on the document, h) generating a bitmap for at least one redundant machine-readable code to be printed in one of the additional available areas on the document;

i) printing with a luminescent ink in one of the additional available areas at least one redundant machine-readable code from the at least one redundant machine-readable code bitmap.

9. A method according to claim 7 wherein the primary machine-readable code is printed in the largest available area.

10. A method according to claim 7 wherein the primary machine-readable code is printed in the maximum size permitted for printing without overlap with other printed areas.

11. A method according to claim 7 wherein the luminescent ink is invisible luminescent ink.

12. A method according to claim 7 wherein the machine-readable is a 2-D bar code.

13. A method according to claim 12 wherein an error correction code level of the 2-D bar code that will fit in the available area is determined.

14. The method of claim 7 wherein the document is one of a legal document, a financial document, a mailpiece and a label.

15. A computer readable medium for providing program code for execution by a programmable data processor, the processor being responsive to said program code to:

a) determine locations and area of text and graphics to be printed on a document with visible ink, b) determine available areas on the document where no text or graphics will be printed in visible ink, c) determine a maximum size of a machine-readable code that will fit in the available area on the document, d) generate a bitmap for the machine-readable code to be printed in the available area, e) to control a printer to print a primary machine-readable code from the bitmap with a luminescent ink in a primary available area.

16. The computer readable medium of claim 15 wherein the processor being further responsive to said program code to:

f) determine additional available areas on the document where no text or graphics will be printed, g) determine the maximum size of a 2-D bar code that will fit in the additional available areas on the document, h) generate a bitmap for at least one redundant 2-D bar code to be printed in the additional available area, and i) print with a luminescent ink in one of the additional available areas at least one redundant 2-D bar code from the at least one redundant 2-D bar code bitmap.

17. The method of claim 15 wherein the document is one of a legal document, a financial document, a mailpiece and a label.

* * * * *